(12) United States Patent
Cho et al.

(10) Patent No.: US 10,654,419 B2
(45) Date of Patent: May 19, 2020

(54) LUGGAGE ROOM SCREEN APPARATUS OF VEHICLE

(71) Applicants: Hyundai Motor Company, Seoul (KR); Kia Motors Corp., Seoul (KR)

(72) Inventors: Jang Hyun Cho, Seongnam-si (KR); Won Jong Lee, Suwon-si (KR); Hee Cheol Kim, Seoul (KR); Dong Hwan Kim, Seoul (KR); Dong Ha Lee, Incheon (KR)

(73) Assignees: Hyundai Motor Company, Seoul (KR); Kia Motors Corp, Seoul (KR)

( * ) Notice: Subject to any disclaimer, the term of this patent is extended or adjusted under 35 U.S.C. 154(b) by 152 days.

(21) Appl. No.: 16/105,814

(22) Filed: Aug. 20, 2018

(65) Prior Publication Data

US 2019/0315280 A1  Oct. 17, 2019

(30) Foreign Application Priority Data

Apr. 12, 2018  (KR) .......................... 10-2018-0042984

(51) Int. Cl.
*B60R 5/04* (2006.01)
*B60R 9/06* (2006.01)

(52) U.S. Cl.
CPC ................ *B60R 5/047* (2013.01); *B60R 5/04* (2013.01); *B60R 5/044* (2013.01); *B60R 5/045* (2013.01); *B60R 5/048* (2013.01); *B60R 9/065* (2013.01)

(58) Field of Classification Search
CPC ......... B60R 5/047; B60R 5/048; B60R 9/065; B60R 5/045; B60R 5/044; B60R 5/04

USPC .............................. 296/136.03, 37.16, 24.43
See application file for complete search history.

(56) References Cited

U.S. PATENT DOCUMENTS

| | | | | |
|---|---|---|---|---|
| 7,028,872 B2 * | 4/2006 | Lobanoff | ................ | B60R 5/047 296/37.1 |
| 2018/0050643 A1 * | 2/2018 | Bilandzija | ............... | B60R 21/06 |

FOREIGN PATENT DOCUMENTS

| | | |
|---|---|---|
| JP | 4284659 B2 | 6/2009 |
| JP | 5898151 B2 | 4/2016 |
| KR | 10-0618046 B1 | 8/2006 |
| KR | 10-0989608 B1 | 10/2010 |
| KR | 10-1352743 B1 | 1/2014 |

* cited by examiner

*Primary Examiner* — Stephen T Gordon
(74) *Attorney, Agent, or Firm* — Morgan, Lewis & Bockius LLP

(57) ABSTRACT

A luggage compartment screen apparatus of a vehicle may include a moving housing movable along guide rails; a push mechanism to be drawn out or drawn in from the moving housing toward the luggage compartment and be rotatable and formed to have a step in a rotation direction thereof; and a locking mechanism rotatably disposed on the moving housing to be configured to be selectively locked to the guide rail, formed to have a step in a drawn-out and drawn-in direction of the push mechanism, and having a stepped portion in contact with a stepped portion of the push mechanism to be rotated to be locked to the guide rail at the time of a drawn-in operation or a rotation operation of the push mechanism and be rotated to be separated from the guide rail at the time of a drawn-out operation of the push mechanism.

15 Claims, 9 Drawing Sheets

LUGGAGE ROOM SCREEN APPARATUS OF VEHICLE

CROSS REFERENCE TO RELATED APPLICATION

The present application claims priority to Korean Patent Application No. 10-2018-0042984, filed Apr. 12, 2018, the entire contents of which is incorporated herein for all purposes by this reference.

BACKGROUND OF THE INVENTION

Field of the Invention

The present invention relates to a luggage compartment screen apparatus of a vehicle configured for improving the convenience of a user by allowing a position of a screen in a luggage compartment to be simply changeable.

DESCRIPTION OF RELATED ART

Generally, the rear of a vehicle is provided in a luggage compartment in which a luggage may be loaded.

Here, a luggage compartment of a sports utility vehicle (SUV) is provided in communication with a rear seat, and a luggage loaded in the luggage compartment may be confirmed with the naked eyes from the outside. Therefore, the luggage in the luggage compartment comes over to the front of the rear seat at the time of collision of the vehicle, such that an accident may occur, and since the luggage loaded in the luggage compartment may be confirmed with the naked eyes from the outside, there is a risk that the luggage will be stolen.

To solve these problems, the luggage compartment is provided with a screen preventing exposure of the loaded luggage and preventing the luggage in the luggage compartment from being bounced. However, the screen according to the related art is fixedly installed at any one place in the luggage compartment, and may thus perform only an operation of completely covering the luggage or completely opening the luggage.

Therefore, luggages having various sizes may not be accommodated, and there is a limitation in dividing the luggage compartment using the screen.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a luggage compartment screen apparatus of a vehicle configured for diversifying a deployment position of a screen depending on a fixed position of the screen by allowing a position of the screen to be simply changeable.

According to an exemplary embodiment of the present invention, a luggage compartment screen apparatus of a vehicle may include: a moving housing provided to be movable along guide rails disposed in a luggage compartment; a push mechanism disposed to be drawn out or drawn in from the moving housing toward the luggage compartment and be rotatable and formed to have a step in a rotation direction thereof; and a locking mechanism rotatably disposed on the moving housing to be configured to be selectively locked to the guide rail, formed to have a step in a drawn-out and drawn-in direction of the push mechanism, and having a stepped portion in contact with a stepped portion of the push mechanism to be rotated to be locked to the guide rail at the time of a drawn-in operation or a rotation operation of the push mechanism and be rotated to be separated from the guide rail at the time of a drawn-out operation of the push mechanism.

Sliding grooves extending in a longitudinal direction of the guide rails may be formed in the guide rails, and sliding protrusions inserted into the sliding grooves and slid in the sliding grooves may be formed in the moving housing.

Locking grooves which are spaced from each other by a predetermined interval and into which the locking mechanism is inserted and locked may be formed in the sliding groove of the guide rail.

An insertion hole into which the push mechanism is inserted may be formed in the moving housing, an installation hole in which the locking mechanism is disposed may be formed in the insertion hole, and the insertion hole and the installation hole may be in communication with each other.

A push latch may be provided in the insertion hole of the moving housing, and the push latch may have one end portion exposed from the moving housing to the luggage compartment and formed so that a screen bar is fastened thereto and the other end portion formed so that the push mechanism is locked to or unlocked from the push latch.

The insertion hole may be provided with a first elastic portion elastically supporting the push mechanism toward the luggage compartment.

The locking mechanism may have one end portion formed to be locked to the guide rail and the other end portion rotatably disposed in the installation hole and may have a plurality of jaws protruding on an end surface thereof facing the push mechanism to have a step.

A hinge pin may be formed at the other end portion of the locking mechanism, and may be rotatably inserted into the installation hole.

The locking mechanism may include a first jaw and a second jaw formed from the other side thereof to one side thereof, and the first jaw may protrude at a height higher than that of the second jaw.

The first jaw and the second jaw may be formed to be bent.

The push mechanism may include a depressed groove formed in a portion of a circumferential surface thereof that the locking mechanism is in contact with, and steps may be formed in the vicinity of the depressed groove.

A locking jaw may be formed on a circumferential surface of the push mechanism, and a corresponding jaw for limiting a rotation position of the push mechanism may be formed in an insertion hole of the moving housing.

The moving housing may be provided with a second elastic portion elastically supporting the locking mechanism toward the push mechanism.

The push mechanism may include a touch portion having a plate shape and an extending portion extending from the touch portion and one or more locking protrusions may be formed along a circumference of the extending portion, and a screen bar may be provided with a fixing portion formed to surround the touch portion and a fastening groove into which the extending portion is inserted may be formed in the fixing portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
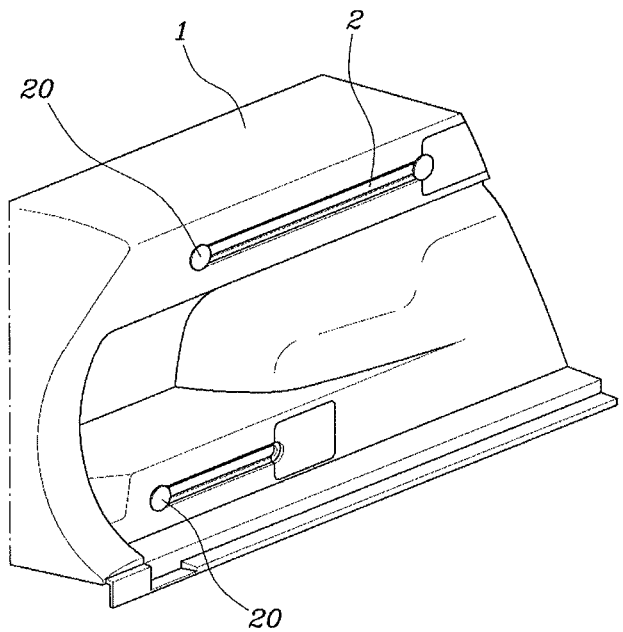
FIG. 1, FIG. 2, and FIG. 3 are views illustrating a luggage compartment screen apparatus of a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of invention as defined by the appended claims.

Hereinafter, a luggage compartment screen apparatus of a vehicle according to an exemplary embodiment of the present invention is described with reference to the accompanying drawings.

Figure 2:
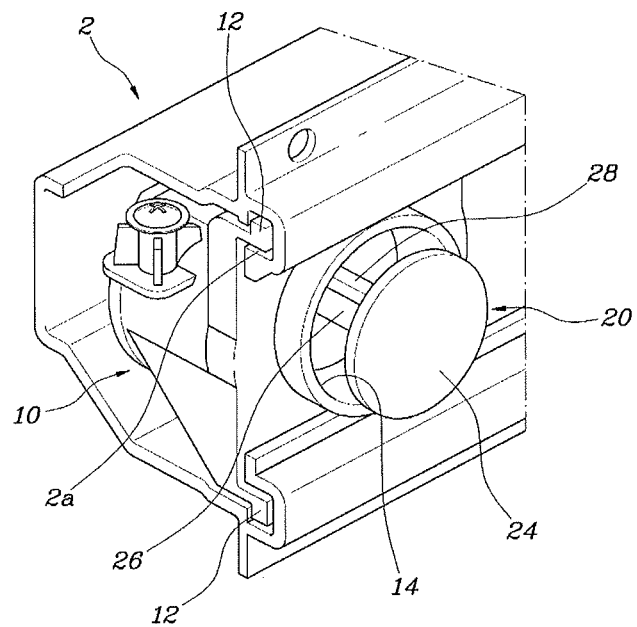
Figure 3:
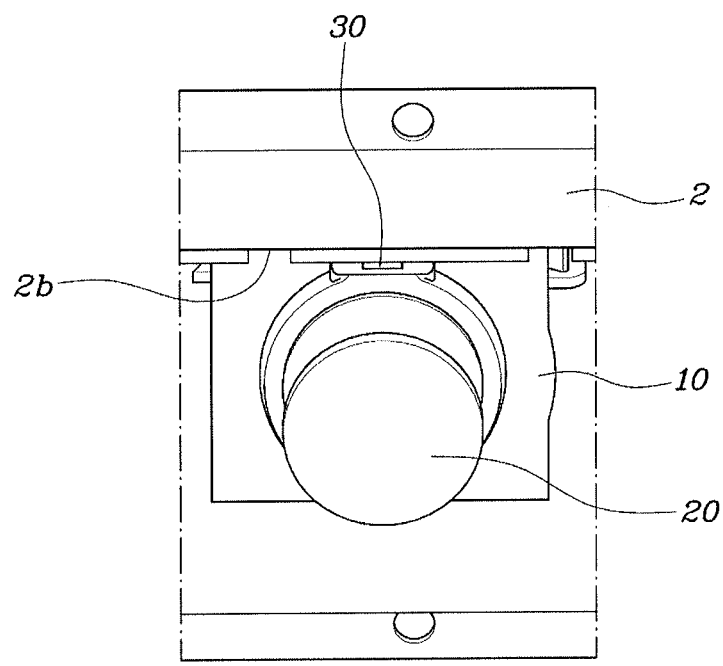
Figure 4:
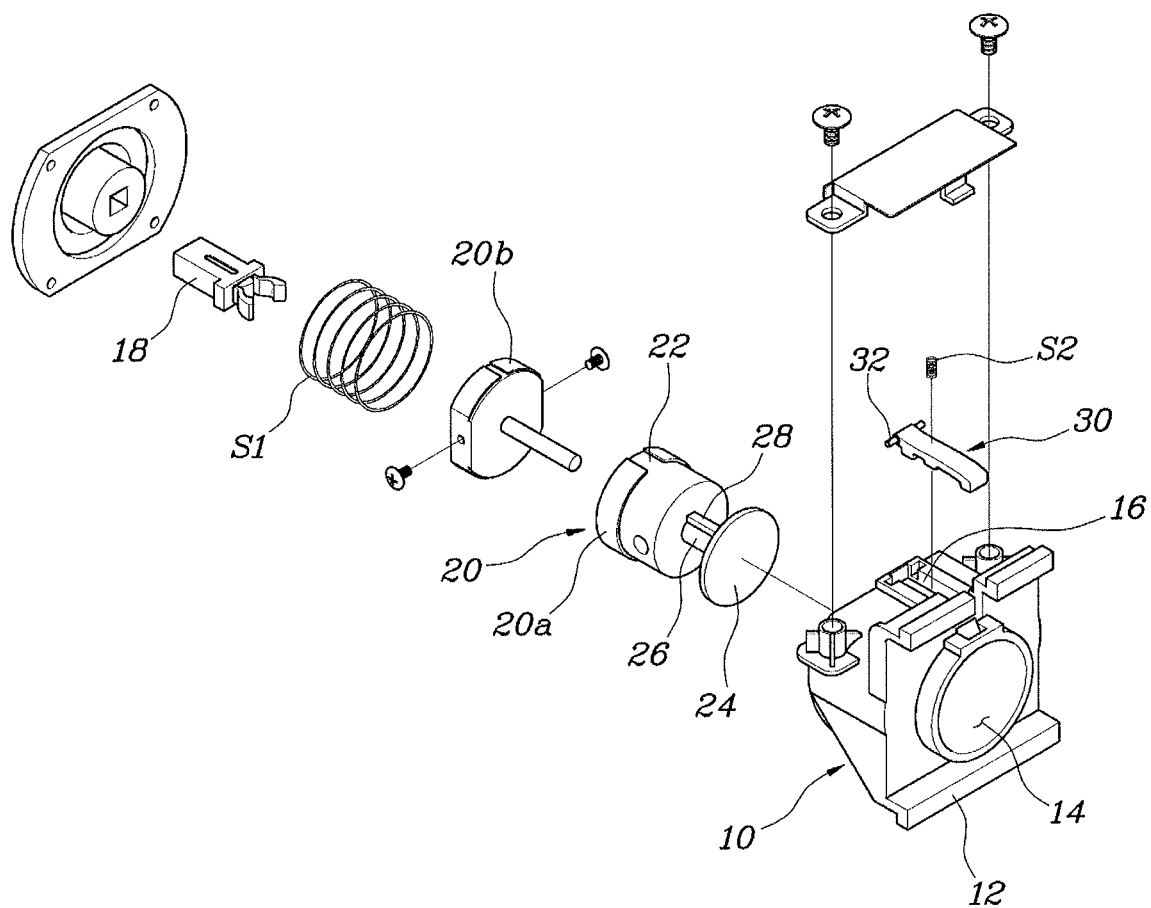
FIG. 4 is an exploded view of the luggage compartment screen apparatus of a vehicle illustrated in FIG. 1.

FIG. 1, FIG. 2, and FIG. 3 are views illustrating a luggage compartment screen apparatus of a vehicle according to an exemplary embodiment of the present invention, FIG. 4 is an exploded view of the luggage compartment screen apparatus of a vehicle illustrated in FIG. 1, and FIG. 5, FIG. 6, FIG. 7, FIG. 8, FIG. 9, FIG. 10, FIG. 11, FIG. 12, FIG. 13, FIG. 14, FIG. 15, and FIG. 16 are views for describing the luggage compartment screen apparatus of a vehicle illustrated in FIG. 1.

The luggage compartment screen apparatus of a vehicle according to an exemplary embodiment of the present invention includes a moving housing 10 provided to be movable along guide rails 2 disposed in a luggage compartment 1; a push mechanism 20 disposed to be drawn out or drawn in from the moving housing 10 toward the luggage compartment 1 and be rotatable and formed to have a step in a rotation direction thereof; and a locking mechanism 30 rotatably disposed on the moving housing 10 to be configured to be selectively locked to the guide rail 2, formed to have a step in a drawn-out and drawn-in direction of the push mechanism 20, and having a stepped portion in contact with a stepped portion of the push mechanism 20 to be rotated to be locked to the guide rail 2 at the time of a drawn-in operation or a rotation operation of the push mechanism 20 and be rotated to be separated from the guide rail 2 at the time of a drawn-out operation of the push mechanism 20, as illustrated in FIG. 1, FIG. 2, and FIG. 3.

Here, the guide rails 2 extending in front and rear directions of the vehicle may be formed at both sides of the luggage compartment 1, and the moving housing 10 may be disposed to be slid from the guide rails 2 along an extending direction of the guide rails 2. Here, the guide rails 2 may be formed at both sides of the luggage compartment 1 to be symmetrical to each other, and a screen bar 40 may be disposed at various positions depending on positions of the moving housing 10 and the push mechanism 20 formed at upper and lower sides, respectively, in the luggage compartment 1 and provided on the guide rails 2.

The push mechanism 20 is configured to be drawn out and drawn in from the moving housing 10 to the luggage compartment 1 and be rotatable, and the locking mechanism 30 is fastened to or separated from the guide rail 2 depending on whether the push mechanism 20 is drawn out, drawn in, or is rotated, such that movement of the moving housing 10 on the guide rails 2 is selectively allowed.

That is, the push mechanism 20 is formed to have the step in the rotation direction thereof, and the locking mechanism 30 provided to be in contact with the push mechanism 20 is formed to have the step in the drawn-out and drawn-in direction thereof, such that the locking mechanism 30 may be selectively locked to or unlocked from the guide rail 2 depending on whether the push mechanism 20 is drawn out, drawn in, or is rotated.

In detail, in a state in which the push mechanism 20 is drawn in, the locking mechanism 30 is fastened to the guide rail 2 to limit the movement of the moving housing 10. On the other hand, at the time of the drawn-out operation of the push mechanism 20, the locking mechanism 30 having the step is rotated by the push mechanism 20 to be separated from the guide rail 2, allowing the movement of the moving housing 10. Therefore, the moving housing 10 may be moved to a position desired by a user along the guide rails 2. In a state in which the push mechanism 20 is drawn out from the moving housing 10 as described above, when the screen bar 40 is disposed in the push mechanism 20 and is then rotated, the push mechanism 20 is rotated with the screen bar 40, such that the locking mechanism 30 is rotated along the stepped portion of the push mechanism 20 formed in the rotation direction to be again inserted into the guide rail 2. Therefore, the locking mechanism 30 is fastened to the guide rail 2, and a position of the moving housing 10 is thus fixed, such that a position of the screen depending on a position of the screen bar 40 may be determined.

The present invention described above is described in detail. As illustrated in FIG. 2, sliding grooves 2a extending in a longitudinal direction of the guide rails 2 may be formed in the guide rails 2, and sliding protrusions 12 inserted into the sliding grooves 2a and slid in the sliding grooves 2a may be formed in the moving housing 10.

As described above, the sliding grooves 2a extending in the longitudinal direction of the guide rails 2 is formed in the guide rails 2. In the instant case, the sliding grooves 2a may be formed at upper and lower sides, respectively, to be spaced from each other. Therefore, the sliding protrusions 12 formed in the moving housing 10 may be formed at upper and lower sides, respectively, and the sliding protrusions 12 are slid along the sliding grooves 2a in a state in which they are inserted into the sliding grooves 2a, such that the moving housing 10 may be moved in front and rear directions in the guide rails 2.

The sliding grooves 2a and the guide rails 2 and the sliding protrusions 12 of the moving housing 10 may have locking structures so as not to be separated from each other at the time of being insertion-connected to each other.

Meanwhile, as illustrated in FIG. 3, locking grooves 2b which are spaced from each other by a predetermined interval and into which the locking mechanism 30 is inserted and locked may be formed in the sliding groove 2a of the guide rail 2.

The locking grooves 2b of the guide rail 2 are formed at a width equal to or greater than that of the locking mechanism 30, such that the locking mechanism 30 may be inserted into the locking grooves 2b, and in the case in which an interval between the locking grooves 2b formed in the sliding groove 2a is narrow, the locking mechanism 30 may be inserted into the locking grooves 2b at various positions, such that a position at which the moving housing 10 is fixed at the guide rail 2 may be diversified.

Meanwhile, an insertion hole 14 into which the push mechanism 20 is inserted may be formed in the moving housing 10, an installation hole 16 in which the locking mechanism 30 is disposed may be formed in the insertion hole 14, and the insertion hole 14 and the installation hole 16 may be in communication with each other.

That is, as illustrated in FIG. 4, the push mechanism 20 may be inserted into the insertion hole 14 formed in the moving housing 10 to be drawn out or drawn in, the locking mechanism 30 is rotatably disposed in the insertion hole 14, and the insertion hole 14 and the installation hole 16 are in communication with each other, such that the locking mechanism 30 disposed in the insertion hole 14 may be in contact with the push mechanism 20 in the insertion hole 14.

Meanwhile, a push latch 18 provided in the insertion hole 14 of the moving housing 10 may have one end portion exposed from the moving housing 10 to the luggage compartment 1 and formed so that the screen bar 40 is fastened thereto and the other end portion formed so that the push mechanism 20 is locked to or unlocked from the push latch 18.

Figure 5:
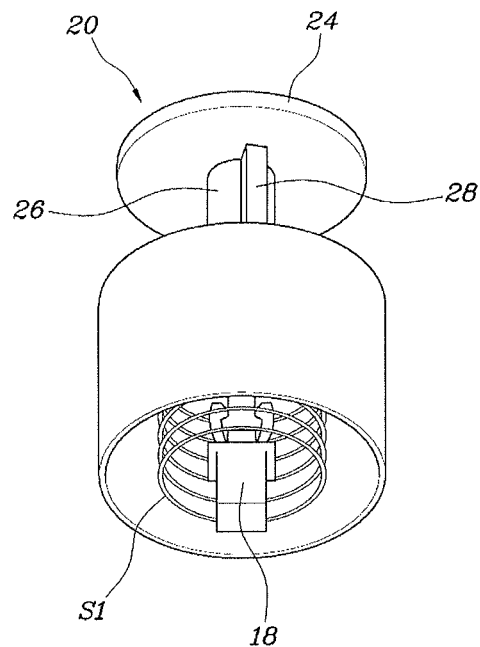
FIG. 5, FIG. 6, FIG. 7, FIG. 8, FIG. 9, FIG. 10, FIG. 11, FIG. 12, FIG. 13, FIG. 14, FIG. 15, and FIG. 16 are views for describing the luggage compartment screen apparatus of a vehicle illustrated in FIG. 1.

As illustrated in FIG. 4 and FIG. 5, the push mechanism 20 is locked to or unlocked from the push latch 18 in the insertion hole 14, such that the drawn-out operation of the push mechanism is allowed. That is, in the case in which the push mechanism 20 is drawn in, the other end portion of the push mechanism 20 is locked to the push latch 18, such that the push mechanism 20 may be maintained in a state in which it is drawn in an internal space of the moving housing 10. Here, when the push mechanism 20 is pressed, due to an unlocking operation of the push latch 18, the push mechanism 20 may receive elastic force provided from a first elastic portion S1 to be described below to be drawn out from the insertion hole 14 of the moving hosing 10.

Figure 6:
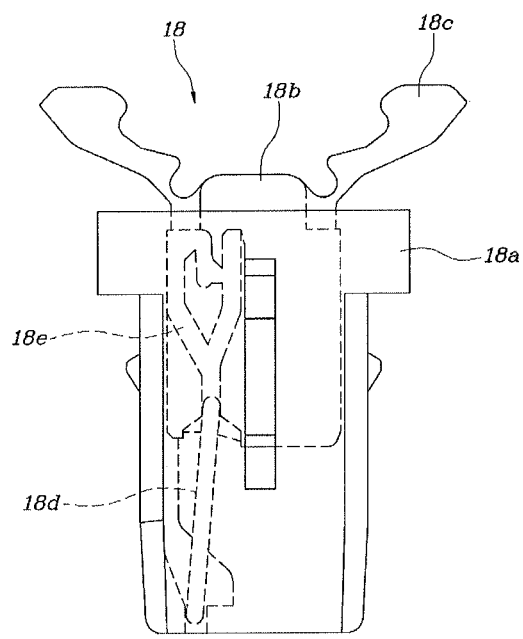

The push latch 18 includes a locking member 18b drawn in or drawn out from a case 18a, and the locking member 18b has tongs 18c having a width that becomes narrow when the locking member 18b is drawn in and becomes wide when the locking member 18b is drawn out, as illustrated in FIG. 6. The case 18a is provided with a pin 18d which is rotatably disposed, and a path 18e through which the pin 18d is moved depending on the draw-in or the draw-out of the locking member 18b is formed in the locking member 18b, such that a corresponding position is fixed depending on the draw-in or the draw-out of the locking member 18b. The push latch 18 is not limited to an exemplary embodiment illustrated in FIG. 6, and the push latch 18 is the well-known technology, and a description of a detailed operation thereof is thus omitted.

Meanwhile, as illustrated in FIG. 4 and FIG. 5, one end portion of the push mechanism 20 may be formed to be exposed in the insertion hole 14 of the moving housing 10, and the other end portion of the push mechanism 20 may have a protrusion formed to be locked to the push latch 18. The push mechanism 20 may include a first portion 20a moved in the insertion hole 14 of the moving housing 10 and formed so that the screen bar 40 is locked thereto and a second portion 20b coupled to the first portion 20a and formed to be locked to the push latch 18, as illustrated in FIG. 4. Therefore, the first portion 20a may form one end portion of the push mechanism 20, and the second portion 20b may form the other end portion of the push mechanism 20.

Meanwhile, the insertion hole 14 is provided with the first elastic portion S1 elastically supporting the push mechanism 20 toward the luggage compartment 1, such that the push mechanism may be drawn out in the insertion hole 14. That is, the push mechanism 20 may be inserted into the insertion hole 14 of the moving housing 10 and be locked to the push latch 18, such that it may be maintained in a state in which it is drawn in, and when the push latch 18 is unlocked by pressing the push mechanism 20, the push mechanism 20 is bounced by the elastic force of the first elastic portion S1, such that the push mechanism 20 may be drawn out from the moving housing 10.

Hereinafter, a case in which the moving housing 10 is moved on the guide rails 2 or a position of the moving housing 10 is fixed by an operation of the push mechanism 20 is described with reference to FIGS. 7 through 14.

The locking mechanism 30 has one end portion formed to be locked to the guide rail 2 and the other end portion rotatably disposed in the installation hole 16, and may have a plurality of jaws protruding on an end surface thereof facing the push mechanism 20 to have a step.

Figure 7:
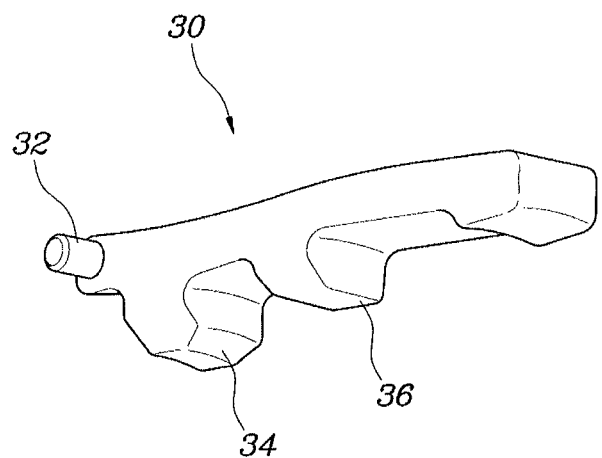

That is, since the other end portion of the locking mechanism 30 is rotatably disposed in the installation hole 16, the locking mechanism 30 may be rotated in a vertical direction thereof. Here, as illustrated in FIG. 7, a hinge pin 32 is formed at the other end portion of the locking mechanism 30. The hinge pin 32 is rotatably inserted into the installation hole 16 and is rotated in the vertical direction thereof, such that one end portion of the locking mechanism 30 may be locked to the guide rail 2 to selectively allow the movement of the moving housing 10. In an exemplary embodiment of the present invention, since the locking grooves 2b formed in the guide rail 2 are formed at an upper portion, when the locking mechanism 30 is rotated upwardly, the locking mechanism 30 may be locked to the guide rail 2 to allow the movement of the moving housing 10 to be limited.

Figure 8:
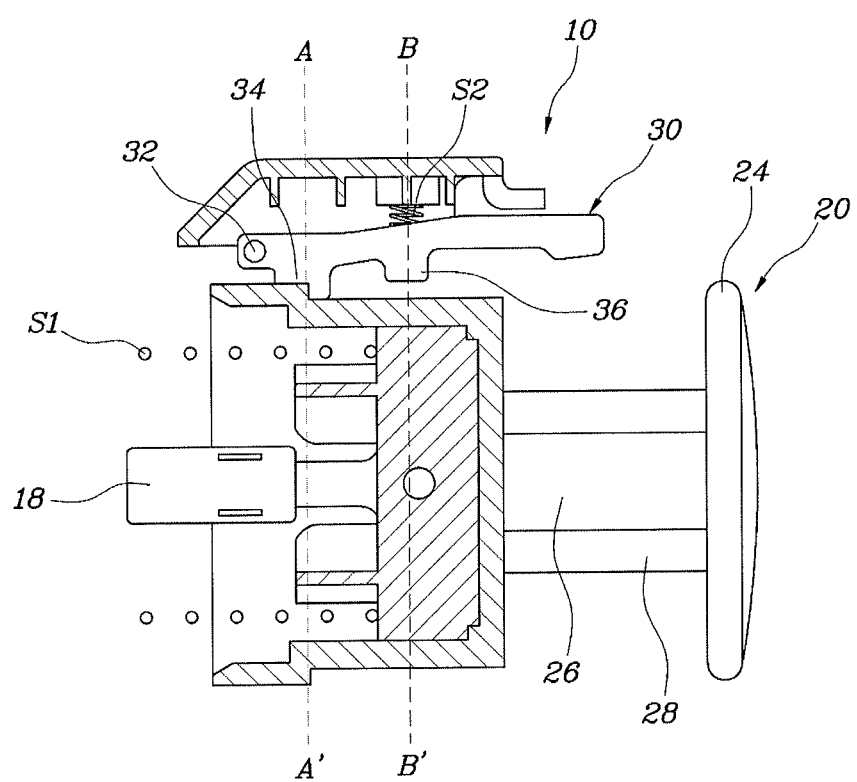

Meanwhile, as illustrated in FIGS. 7 and 8, the locking mechanism 30 may include a first jaw 34 and a second jaw 36 formed from the other side thereof to one side thereof, and the first jaw 34 may protrude at a height higher than that of the second jaw 36.

That is, the locking mechanism 30 is formed to have the step in the drawn-out and drawn-in direction thereof, and includes the first jaw 34 and the second jaw 36 formed from the other side thereof directed toward the luggage compartment 1 to one side thereof and having different heights, and the push mechanism 20 is in contact with the first jaw 34 or the second jaw 36, such that a rotation position of the locking mechanism 30 may be determined. Here, the first jaw 34 protrudes at the height higher than that of the second jaw 36, such that the locking mechanism 30 may be locked to the guide rail 2 or separated from the guide rail 2 depending on a contact position of the push mechanism 20.

The first jaw 34 and the second jaw 36 may be formed to be bent, allowing the push mechanism 20 to be flexibly moved along the bent portions at the time of being in contact with the first jaw 34 and the second jaw 36.

Figure 9:
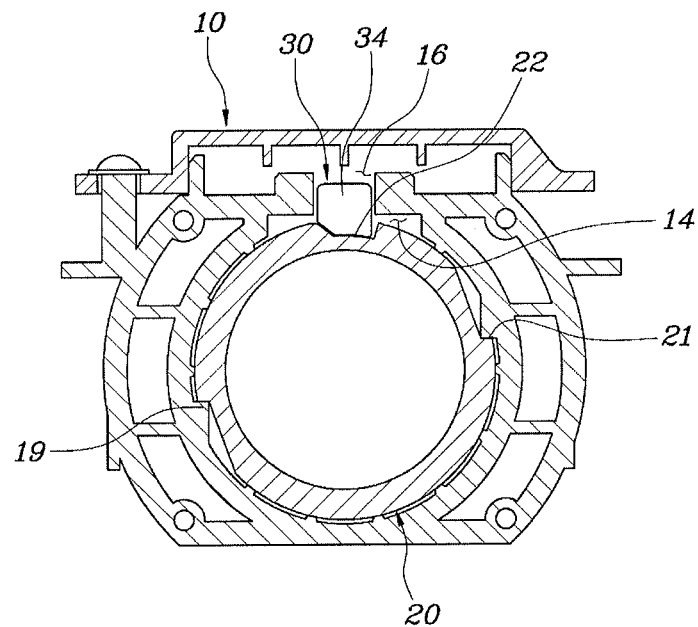
Figure 10:
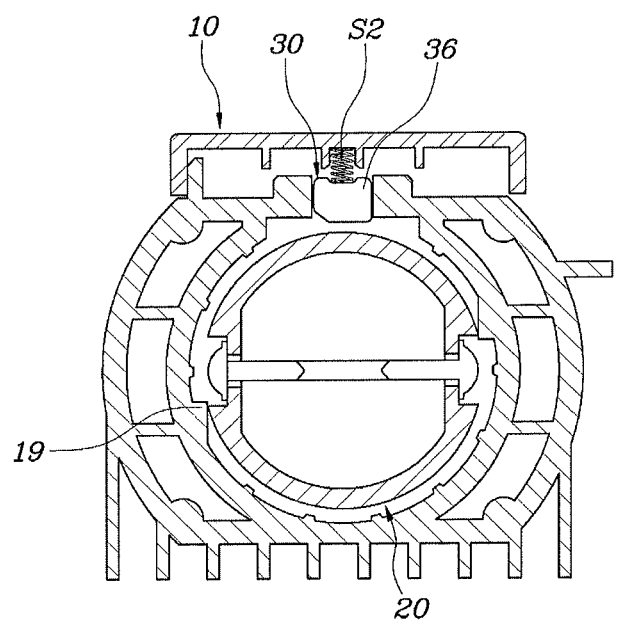

Meanwhile, as illustrated in FIG. 9, the push mechanism 20 includes a depressed groove 22 formed in a portion of a circumferential surface thereof that the locking mechanism 30 is in contact with, and steps may be formed in the vicinity of the depressed groove 22.

That is, the push mechanism 20 that the locking mechanism 30 is in contact with needs to be configured so that the locking mechanism 30 is locked to the guide rail 2 or separated from the guide rail 2 when the push mechanism 20 is rotated. To the present end, the push mechanism 20 includes the depressed groove 22 formed in the portion of the circumferential surface thereof that the locking mechanism 30 is in contact with, and height differences are generated at both sides of the depressed groove 22, such that the steps are formed. The depressed groove 22 is formed in the circumferential surface of the push mechanism 20, such that the locking mechanism 30 may be inserted into the depressed groove 22 or may be rotated by a height deviation generated at the time of movement to the circumferential surface, depending on whether or not the push mechanism 20 is rotated in a state in which the locking mechanism 30 is in contact with the circumferential surface of the push mechanism 20.

Meanwhile, as illustrated in FIG. 9, a locking jaw 21 may be formed on the circumferential surface of the push mechanism 20, and a corresponding jaw 19 for limiting a rotation position of the push mechanism 20 may be formed in the insertion hole 14 of the moving housing 10. The locking jaw is formed on a portion of the circumferential surface except for the portion of the circumferential surface in which the depressed groove 22 is formed, and the corresponding jaw to which the locking jaw is locked is formed in the insertion hole 14 of the moving housing 10, such that the rotation of the push mechanism 20 may be limited to only a position at which the locking jaw is in contact with the corresponding jaw 19 of the moving housing 10. The position at which the locking jaw of the push mechanism 20 and the corresponding jaw 19 of the moving housing 10 are in contact with each other may be an initial rotation position of the push mechanism 20, and the numbers of locking jaws and corresponding jaws 19 may be plural.

Meanwhile, as illustrated in FIGS. 4 and 8, the moving housing 10 may be provided with a second elastic portion S2 elastically supporting the locking mechanism 30 toward the push mechanism 20.

Therefore, the locking mechanism 30 receives elastic force of the second elastic portion S2 to be elastically supported toward the push mechanism 20, such that the locking mechanism 30 may be maintained in a state in which it is in contact with the push mechanism 20, and the locking mechanism 30 returns to an original position thereof, such that the next operation may be performed in a state in which the locking mechanism 30 is in contact with the push mechanism 20 at the time of the draw-out/draw-in/rotation of the push mechanism 20.

Figure 15:
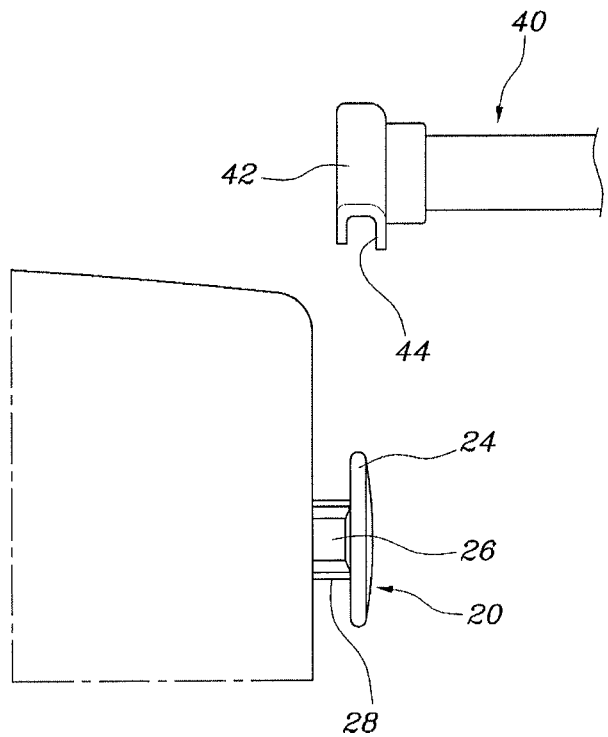
Figure 16:
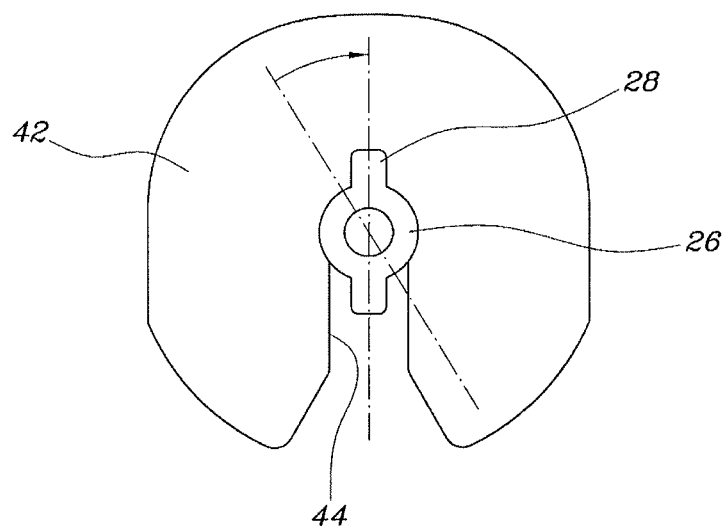

Meanwhile, as illustrated in FIG. 15 and FIG. 16, the push mechanism 20 may include a touch portion 24 having a plate shape and an extending portion 26 extending from the touch portion 24 and one or more locking protrusions 28 may be formed along a circumference of the extending portion 26, and the screen bar 40 may be provided with a fixing portion 42 formed to surround the touch portion 24 and a fastening groove 44 into which the extending portion 26 is inserted may be formed in the fixing portion 42.

Here, the screen bar 40 has a bar form to which a screen is connected, and includes the fixing portion 42 formed at a distance end portion thereof, the fastening groove 44 is formed in the fixing portion 42, and the touch portion 24 of the push mechanism 20 may be inserted into the fastening groove 44 of the fixing portion 42 to couple the screen bar 40 to the push mechanism 20.

The push mechanism 20 includes the locking protrusions 28 formed on the extending portion 26 extending from the touch portion 24, and the locking protrusions 28 are locked and connected to the fixing portion 42 of the screen bar 40 through the fastening groove 44, such that when the screen bar 40 is rotated, the push mechanism 20 may be rotated with the screen bar 40.

Hereinafter, an operation of the luggage compartment 1 screen apparatus of a vehicle according to an exemplary embodiment of the present invention described above is described.

As illustrated in FIG. 8, in a state in which the push mechanism 20 is drawn in the moving housing 10, the first jaw 34 of the locking mechanism 30 becomes a state in which it is in contact with the other end portion of the push mechanism 20. Therefore, as seen in a cross-sectional view taken along line A-A' of FIG. 8 and illustrated in FIG. 9, the first jaw 34 of the locking mechanism 30 is accommodated in the depressed groove 22 of the push mechanism 20, such that the locking mechanism 30 is maintained in a state in which it is rotated upwardly as illustrated in FIG. 9, and as seen in a cross-sectional view taken along line B-B' of FIG. 8 and illustrated in 10, the second jaw 36 of the locking mechanism 30 becomes a state in which it is not in contact with the push mechanism 20.

Therefore, the locking mechanism 30 may be rotated upwardly to be inserted into the locking groove 2b of the guide rail 2, and a position of the moving housing 10 is thus fixed in the guide rail 2 together with the locking mechanism 30.

Figure 11:
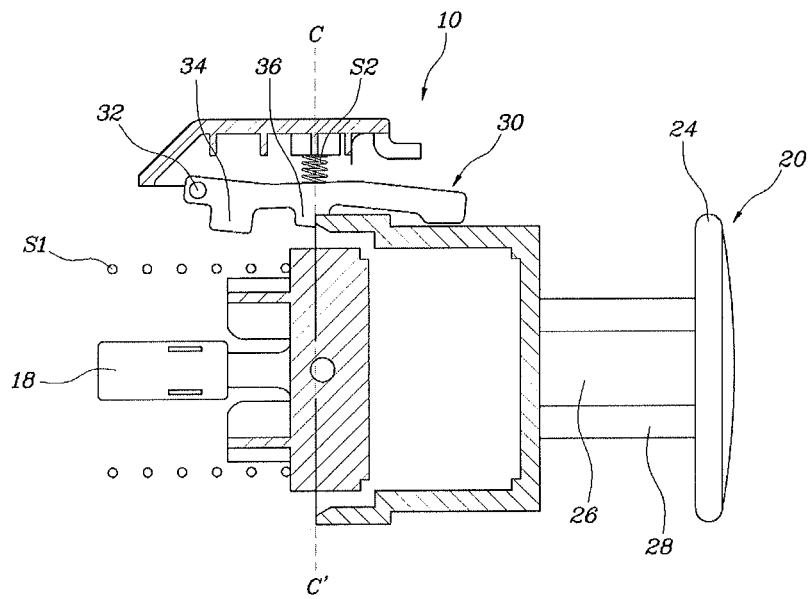
Figure 12:
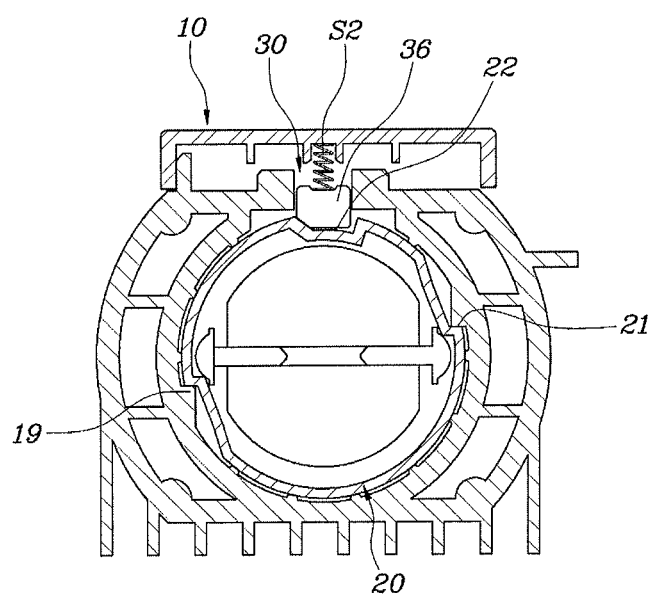

Here, as illustrated in FIG. 11, the push mechanism 20 is moved to one side toward the luggage compartment 1 at the time of being drawn out, such that the other end portion of the push mechanism 20 is moved from the first jaw 34 of the locking mechanism 30 to be in contact with the second jaw 36 of the locking mechanism 30. In the instant case, the second jaw 36 of the locking mechanism 30 is formed at a protrusion height relatively lower than that of the first jaw 34, such that the locking mechanism 20 is rotated downwardly. Therefore, as seen in a cross-sectional view taken along line C-C' of FIG. 11 and illustrated in FIG. 12, the second jaw 36 of the locking mechanism 30 is accommodated in the depressed groove 22 of the push mechanism 20, such that the locking mechanism 30 is rotated by a height deviation between the first jaw 34 and the second jaw 36.

Therefore, the locking mechanism 30 is rotated downwardly to be separated from the locking groove 2b of the guide rail 2, such that the moving housing is slidable on the guide rail 2, and the user may thus adjust the position of the push mechanism 20.

Here, the push mechanism 20 may be moved on the guide rail 2 together with the movement of the screen bar 40 after the screen bar 40 is coupled to the push mechanism 20.

Figure 13:
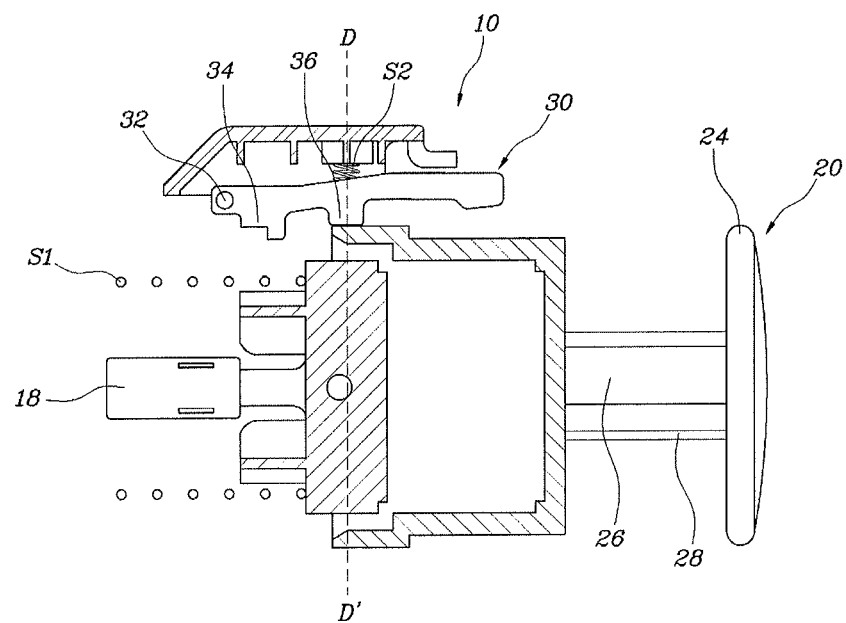
Figure 14:
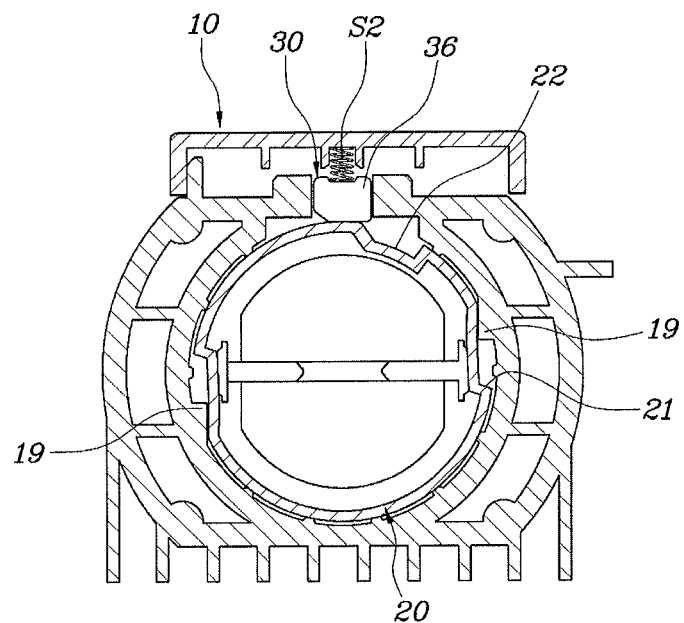

Meanwhile, as illustrated in FIG. 13, in a state in which the position of the moving housing 10 is determined, when the user rotates the screen bar 40, the push mechanism 20 is rotated with the screen bar 40. In the instant case, as the push mechanism 20 is rotated, as seen in a cross-sectional view taken along line D-D' of FIG. 13 and illustrated in FIG. 14, the second jaw 36 of the locking mechanism 30 accommodated in the depressed groove 22 of the push mechanism 20 is separated from the depressed groove 22 and is then moved to the circumferential surface of the push mechanism 20, and the locking mechanism 30 is rotated upwardly by a height deviation between the circumferential surface of the push mechanism 20 and the depressed groove, such that the locking mechanism 30 is inserted into the locking groove 2b of the guide rail 2, and a position of the locking mechanism 30 may thus be fixed.

Therefore, a position of the screen bar 40 may be fixed together with the moving housing 10.

In the luggage compartment 1 screen apparatus of a vehicle having the structure as described above, the guide rail 2 is provided with the push mechanism 20 of which the position is changed, and the screen bar 40 is coupled to the push mechanism 20 to change a deployment position of the screen, such that the screen may be disposed at a position desired by the user. Furthermore, exposure of the push mechanism 20 in the guide rail 2 is minimized when the screen is not used, the push mechanism 20 is drawn out from the guide rail 2 at the time of using the screen to enable installation of the screen bar 40, and the position of the push mechanism is fixed by a simple manipulation in a state in which the screen bar 40 is disposed, such that convenience of the user is improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A luggage compartment screen apparatus of a vehicle, comprising:
    a moving housing provided to be movable along guide rails disposed in a luggage compartment;
    a push mechanism engaged in the moving housing and having a step formed in a rotation direction of the push mechanism, wherein the push mechanism is disposed to be drawn out or drawn in from the moving housing toward the luggage compartment and to be rotatable; and
    a locking mechanism rotatably disposed on the moving housing to be selectively locked to one of the guide rails,
    wherein the locking mechanism is formed to have a step in a drawn-out and drawn-in direction of the push mechanism, and includes a stepped portion in contact with a stepped portion of the push mechanism to be rotated to be locked to the guide rail at a time of a drawn-in operation or a rotation operation of the push mechanism and be rotated to be separated from the guide rail at a time of a drawn-out operation of the push mechanism.

2. The luggage compartment screen apparatus of the vehicle of claim 1,
    wherein sliding grooves extending in a longitudinal direction of the guide rails are formed in the guide rails, and
    wherein sliding protrusions inserted into the sliding grooves and slid in the sliding grooves are formed in the moving housing.

3. The luggage compartment screen apparatus of the vehicle of claim 2, wherein locking grooves which are spaced from each other in a predetermined interval therebetween and into which the locking mechanism is inserted and locked are formed in each sliding groove of the guide rails.

4. The luggage compartment screen apparatus of the vehicle of claim 1,
    wherein an insertion hole into which the push mechanism is inserted is formed in the moving housing,
    wherein an installation hole in which the locking mechanism is pivotally disposed is formed in the insertion hole, and
    wherein the insertion hole and the installation hole are in communication with each other.

5. The luggage compartment screen apparatus of the vehicle of claim 4,
    wherein a push latch is provided in the insertion hole of the moving housing, and
    wherein the push latch has:
        a first end portion exposed from the moving housing to the luggage compartment, wherein a screen bar is fastened to the first end portion of the push latch; and
        a second end portion wherein the push mechanism is locked to or unlocked from the second end portion of the push latch.

6. The luggage compartment screen apparatus of the vehicle of claim 4, wherein the insertion hole is provided with a first elastic portion elastically supporting the push mechanism toward the luggage compartment.

7. The luggage compartment screen apparatus of the vehicle of claim 4, wherein the locking mechanism includes:
    a first end portion formed to be locked to the guide rail;
    a second end portion rotatably disposed in the installation hole; and
    a plurality of jaws protruding on an end surface of the locking mechanism and facing the push mechanism to have the step.

8. The luggage compartment screen apparatus of the vehicle of claim 7, wherein a hinge pin is formed at the second end portion of the locking mechanism and coupled to the insertion hole.

9. The luggage compartment screen apparatus of the vehicle of claim 7,
    wherein the plurality of jaws includes a first jaw and a second jaw at a first side and a second side of the locking mechanism, respectively, and
    wherein the first jaw protrudes at a height higher than a height of the second jaw from a body of the locking mechanism.

10. The luggage compartment screen apparatus of the vehicle of claim 9, wherein the first jaw and the second jaw are formed to be bent.

11. The luggage compartment screen apparatus of the vehicle of claim 1, wherein the push mechanism includes a depressed groove formed in a portion of a circumferential surface thereof where the locking mechanism is in contact with, and steps are formed in a vicinity of the depressed groove.

12. The luggage compartment screen apparatus of the vehicle of claim 1,
wherein a locking jaw is formed on a circumferential surface of the push mechanism, and
wherein a corresponding jaw for limiting a rotation position of the push mechanism by engaging with the locking jaw is formed on a circumferential surface of an insertion hole of the moving housing.

13. The luggage compartment screen apparatus of the vehicle of claim 6, wherein the moving housing is provided with a second elastic portion elastically supporting the locking mechanism toward the push mechanism.

14. The luggage compartment screen apparatus of the vehicle of claim 13, wherein the second elastic portion is disposed between the moving housing and the locking mechanism.

15. The luggage compartment screen apparatus of the vehicle of claim 1,
wherein the push mechanism includes a touch portion having a plate shape and an extending portion extending from the touch portion and at least a locking protrusion is formed along a circumference of the extending portion, and
wherein a screen bar is provided with a fixing portion formed to surround the touch portion and a fastening groove into which the extending portion is inserted is formed in the fixing portion.

\* \* \* \* \*